(12) United States Patent
Zimmermann et al.

(10) Patent No.: US 12,235,621 B2
(45) Date of Patent: Feb. 25, 2025

(54) METHOD FOR ALIGNING A WORKPIECE IN A MACHINE TOOL

(71) Applicant: DR. JOHANNES HEIDENHAIN GmbH, Traunreut (DE)

(72) Inventors: Robert Zimmermann, Traunstein (DE); Gero Guenther, Truchtlaching (DE); Bernhard Hajduk, Traunreut (DE); Martin Gaisser, Chieming (DE); Stefan Huber, Traunwalchen (DE); Sebastian Jung, Palling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 423 days.

(21) Appl. No.: 17/944,238

(22) Filed: Sep. 14, 2022

(65) Prior Publication Data

US 2023/0088649 A1 Mar. 23, 2023

(30) Foreign Application Priority Data

Sep. 17, 2021 (DE) ..................... 10 2021 210 329.4

(51) Int. Cl.
*B23Q 15/22* (2006.01)
*G01B 5/00* (2006.01)
(Continued)

(52) U.S. Cl.
CPC ........... *G05B 19/402* (2013.01); *B23Q 15/22* (2013.01); *G01B 5/00* (2013.01); *G01B 5/004* (2013.01);
(Continued)

(58) Field of Classification Search
CPC ...... G01B 21/042; G01B 21/047; G01B 5/00; G01B 5/004; G01B 5/008; G01B 11/005; G05B 19/401; G05B 19/19; B23Q 15/22
(Continued)

(56) References Cited

U.S. PATENT DOCUMENTS

| 5,208,763 | A | 5/1993 | Hong et al. |
| 5,465,221 | A | 11/1995 | Merat et al. |
| 9,002,688 | B2 * | 4/2015 | Chang ..................... G06F 30/20 |
| | | | 702/33 |
| 9,441,936 | B2 * | 9/2016 | Pinkston ............ G05B 19/4097 |

(Continued)

FOREIGN PATENT DOCUMENTS

| DE | 102005037837 A1 | 2/2007 |
| DE | 102008045678 A1 | 3/2010 |

(Continued)

OTHER PUBLICATIONS

Paul J. Besl and Neil D. Mckay, A Method for Registration of 3-D Shapes, IEEE Transactions on Pattern Analysis and Machine Intelligence, Feb. 1992, pp. 239-256, vol. 14, No. 2, IEEE, Warren, Michigan, USA.

*Primary Examiner* — Ronald D Hartman, Jr.
(74) *Attorney, Agent, or Firm* — LEYDIG, VOIT & MAYER, LTD.

(57) ABSTRACT

A method for aligning a workpiece in a working space of a machine tool having a numerical control system uses a probe. 3D models of the working space, probe, and workpiece are virtually displayed. The workpiece is positioned in the working space and the virtual workpiece is positioned in the virtual working space so that there is an initial coincidence between positions thereof. The probe is manually positioned relative to the workpiece, wherein a planned probing point and probing direction are selected based on a minimum distance of the virtual probe from the virtual workpiece, and are displayed. Enabling of the probing is based on quality of the planned probing point, and, when enabled, a probing operation is triggered, and coordinates of a probing point are determined. The position of the workpiece is recalculated using these coordinates, and the position of the virtual workpiece is updated.

9 Claims, 4 Drawing Sheets

(51) Int. Cl.
  *G01B 11/00* (2006.01)
  *G01B 21/04* (2006.01)
  *G05B 19/19* (2006.01)
  *G05B 19/401* (2006.01)
  *G05B 19/402* (2006.01)
  *G01B 5/004* (2006.01)
  *G01B 5/008* (2006.01)

(52) U.S. Cl.
  CPC ............ *G01B 5/008* (2013.01); *G01B 11/005* (2013.01); *G01B 21/042* (2013.01); *G01B 21/047* (2013.01); *G05B 19/19* (2013.01); *G05B 19/401* (2013.01); *G05B 2219/41091* (2013.01)

(58) Field of Classification Search
  USPC .......................................................... 700/192
  See application file for complete search history.

(56) References Cited

U.S. PATENT DOCUMENTS

| | | | |
|---|---|---|---|
| 2006/0269123 A1* | 11/2006 | Horita | G06T 7/579 382/154 |
| 2012/0290122 A1* | 11/2012 | Morfino | G05B 19/4069 700/184 |
| 2015/0211847 A1* | 7/2015 | Abe | G01B 21/04 33/503 |
| 2020/0125066 A1* | 4/2020 | Abe | G06T 19/006 |
| 2020/0293779 A1* | 9/2020 | Abe | G01B 21/04 |
| 2020/0333125 A1* | 10/2020 | Mühlbacher | G01B 21/24 |

FOREIGN PATENT DOCUMENTS

| | | | | |
|---|---|---|---|---|
| DE | 102019007348 A1 | 6/2020 | | |
| WO | WO-2012017419 A1 * | 2/2012 | ......... | G05B 19/4069 |
| WO | WO 2016169589 A1 | 10/2016 | | |

* cited by examiner

METHOD FOR ALIGNING A WORKPIECE IN A MACHINE TOOL

CROSS REFERENCE TO RELATED APPLICATION

This application claims benefit to German Patent Application No. DE 10 2021 210 329.4, filed on Sep. 17, 2021, which is hereby incorporated by reference herein.

FIELD

The present invention relates to a method for aligning a workpiece and/or its clamping means in a machine tool. With this method, the position of the coordinate system of the workpiece is determined relative to the coordinate system of the machine tool so that program-controlled machining of the workpiece can be started.

BACKGROUND ART

Aligning the orientation of the coordinate system of a workpiece with that of the coordinate system of a machine tool is becoming increasingly important in computer numerical control (CNC)-controlled machining of workpieces. Orientation detection is important, especially in the case of near-net-shape raw pieces which were manufactured, for example, by precision casting or additive processes, or which were machined by previous operations in a different setup and/or on other machines. In most cases, it is sufficient to know the actual position of the workpiece (in the sense of a deviation from the ideal position expected by a numerical control (NC) program) relative to the machine tool, so that the deviation from an ideal position can be taken into account by coordinate transformations during subsequent machining by means of an NC program.

If the clamping means used to secure the workpiece in the machining space of the machine tool are to be taken into account, for example, for collision monitoring during the machining operation, then the clamping means must be considered in the same way as the workpiece. There must be available geometric models of both the workpiece and the clamping means, whose coordinate systems have to be aligned in terms of orientation with the coordinate system of the machine tool. Since a distinction between clamping means and workpiece is not necessary for the following considerations, the term "workpiece" is hereinafter understood to also cover the clamping means of the workpiece, and the method according to an embodiment of the invention can also be used for aligning a clamping means (without a clamped workpiece). It is completely irrelevant to the execution of the method whether a clamping means, a workpiece to be machined, or both together is/are to be aligned.

Today, modern numerical control systems have a graphical user interface (GUI) which allows a view into a virtual working space of a machine tool. A display screen displays, for example, the workpiece on a table in a simulation, with the machine axes (e.g., linear and rotary axes of a 5-axis machine) being displayed according to their current state. By comparing the virtual representation with the real setup, the user can ensure already during clamping of a workpiece that the position of the workpiece (and thus its clamping means, if applicable) in the working space roughly corresponds to the assumptions of the NC program. Small deviations in the various degrees of freedom can then be measured and taken into account by coordinate transformations when executing an NC program. Often, a degree of freedom is already precisely known by the setup, for example by a planar surface of the workpiece with which this workpiece is placed on the machine table. The position of the workpiece is thus precisely defined perpendicularly to the table and with respect to the rotations about the directions lying in the plane of the table and does not have to be determined by probing.

The alignment or determination of position of a workpiece is usually accomplished by probing the workpiece with a probe, which may, for example, be loaded into the tool holder on the spindle of the machine tool. To do this, the probe is moved to previously defined points on the workpiece by means of the movable axes of the machine tool, and the probing point is registered. The coordinates of the probing point in a Cartesian coordinate system can be calculated from the kinematics of the machine tool, the axis positions at the moment of probing, and the geometry of the probe.

For example, the position of a surface of the workpiece can be determined by probing three points. The offset of the workpiece along this surface is not yet known. The position of the workpiece can be determined in all six degrees of freedom by probing differently oriented surfaces, including curved surfaces, or, more generally, areas of a workpiece. These may be the three linear and mutually orthogonal spatial directions, often referred to as X, Y, Z, and the respective rotations A, B, C about these spatial directions. Various mathematical methods for determining the position of a body from measured points on the body are described, for example, in the article "A Method for Registration of 3D Shapes" by Paul J. Besl and Neil D. McKay (IEEE Transactions on Pattern Analysis and Machine Intelligence, Vol. 14, No. 2, February 1992).

DE 102008045678 A1 discloses a numerical control system for a machine tool that is adapted for predictive monitoring of relatively movable parts of the machine tool with regard to imminent collisions. This monitoring is based on a geometric and kinematic description of the machine tool. Clamping means for securing a workpiece to a work table are also included in the monitoring by the numerical control system having stored therein clamping means descriptions that describe the clamping means actually present in a machining space of the machine tool in such a way that they form part of the geometric and kinematic description of the machine tool. In addition, for each clamping means, probing cycles are stored that define the probing points for determining the position of the clamping means. However, keeping available such clamping means descriptions, including a probing cycle, requires a certain effort that is not always justified. With regard to aligning a workpiece, it would be very costly to generate such data for a unique piece and store it in a numerical control system. In addition, if a probing point cannot be used in the specified probing cycle due to local damage, the alignment will fail.

In addition to automated alignment of the position of a workpiece, of which a model must be available, U.S. Pat. No. 5,208,763 A also discloses an interactive mode according to which a user first selects in the model a surface to be probed, then directs a probe to the corresponding point on the tool and probes this point. When a sufficient number of measurement points have been determined in this way, the actual position is determined for all measurement points by minimizing the squares of the deviations between the assumed position of the workpiece and the measured position. To this end, however, an operator must be very experienced and knowledgeable in order to first select suitable points which, after the measurement, will allow the position of the workpiece to be determined with sufficient accuracy for all degrees of freedom.

SUMMARY

In an embodiment, the present invention provides a method for aligning a workpiece in a working space of a machine tool having a numerical control system using a probe, the method including steps (1)-(7). In step (1) three-dimensional (3D) models of the working space, the probe, and the workpiece are provided and the 3D models are displayed as a virtual workpiece and a virtual probe in a virtual working space on a display screen of the numerical control system. In step (2), the workpiece is positioned in the working space of the machine tool and the virtual workpiece is positioned in the virtual working space so that there is an initial coincidence between a position of the workpiece in the working space and a position of the virtual workpiece in the virtual working space. In step (3), the probe is manually positioned relative to the workpiece, wherein a planned probing point and a probing direction are selected in an automated manner based on a minimum distance of the virtual probe from the virtual workpiece, and the planned probing point and the probing direction are displayed in the virtual working space. In step (4), a quality of the planned probing point is determined, and a probing process is enabled based thereon. In step (5), a probing operation is triggered based on the probing process being enabled, and coordinates of a probing point are determined. In step (6), the position of the workpiece is recalculated using the coordinates of the probing point, and the position of the virtual workpiece is updated in the virtual working space. In step (7), steps (3) through (6) are repeated until a final coincidence is reached between the position of the virtual workpiece in the virtual working space and the position of the workpiece in the working space.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides an improved method for aligning the position of a workpiece, which method assists an operator of a machine tool in the best possible way in selecting points to be probed, and which requires little or no special knowledge from the operator and reduces the alignment effort required as compared to the prior art.

In an embodiment, the present invention provides a method for aligning a workpiece in a machine tool. This method assists an operator of a machine tool in aligning, by means of a probe, a workpiece and/or a clamping means in the working space of the machine tool in such a manner that the model of the working space displayed on a display screen of a numerical control system coincides sufficiently well with reality. For this purpose, the operator can move the probe freely around the workpiece and receives a display of probing points selected in an automated manner, along with quality information. If the quality is sufficient, the operator can trigger a probing operation by pressing a button and receives immediate feedback on the progress of the alignment process.

More specifically, according to an embodiment, a method is provided for aligning, by means of a probe, a workpiece in the working space of a machine tool having a numerical control system, the method including the steps of:

1: providing 3D models of the working space, the probe, and of the workpiece and displaying these models as a virtual workpiece and a virtual probe in a virtual working space on a display screen of the numerical control system,
2: positioning the workpiece in the working space of the machine tool and the virtual workpiece in the virtual working space so that there is an initial coincidence between a position of the workpiece in the working space and the position of the virtual workpiece in the virtual working space,
3: manually positioning the probe relative to the workpiece and, in the process, selecting a planned probing point and a probing direction in an automated manner based on a minimum distance of the virtual probe from the virtual workpiece, and displaying the planned probing point and the probing direction in the virtual working space,
4: determining the quality of the planned probing point and enabling the probing operation if the quality is sufficient, the quality being determined, for example, based on the local curvature of the workpiece at the probing point,
5: triggering the probing operation when probing is enabled, and determining coordinates of the probing point,
6: recalculating the position of the workpiece using the coordinates of the probing point, and updating the position of the virtual workpiece in the virtual working space,
7: repeating the steps 3 through 6 until a final coincidence is reached between the position of the virtual workpiece in the virtual working space and the position of the workpiece in the working space.

In step 1, a suitable model must be provided for the setup situation in the working space of the machine tool. These models are usually available for the unchanging components of the machine tool, such as for the table, for the tool spindle, and for the boundaries of the working space, and are the same for all machining operations performed by this machine tool. For the workpiece (and its clamping means), such models can be obtained from computer-aided design (CAD) data or via processed three-dimensional (3D) scans and are often available in common formats such as standard triangle language (STL) or standard for the exchange of product data (STEP) file formats. A workpiece is thus described as a polyhedron made up of surface elements which are bounded by straight lines (usually triangles). The surface elements of the polyhedron each have a surface normal, and the corner points have vertex normals which approximate the normal direction of the real body at this point. Vertex normals are usually part of CAD data. Alternatively, they can be approximated as the averaged direction of the adjacent surfaces.

The surface of the polyhedron can be described as a polygon mesh, or just mesh. With this, arbitrarily shaped surfaces of a body can be described in a manner that allows performant calculation of things such as surface normal, vertex normal, local curvature of the surface, and distances to other bodies. Like any real body having a volume, the mesh should have a closed surface; i.e., be "watertight."

A model of the probe used must also be available. The probe will usually be a calibrated touch-trigger probe which, after the workpiece is probed and the probe ball is deflected by a small (known) amount, outputs a signal, whereupon the positions of all machine axes are read out. The coordinates of the probing point can be calculated from this and based on the known machine kinematics and based on the probe geometry, which is stored, for example, in the tool table. The use of a scanning probe capable of outputting the amount of its deflection is also possible, but requires a little more computational effort. Instead of a probe ball, other probe bodies are also possible, such as disks or cylinders.

The models provided and the relevant components of the machine tool are displayed together as a graphical simulation on the display screen of a numerical control system, allowing a virtual view into the working space of the machine tool. Such a display is now common in modern control systems and allows a view of the machining process, e.g., even if the view into the real machining space is obstructed, for example, by coolant/lubricants or if the control system is positioned in such a way that it is not possible to view into the working space.

In step 2, the position (i.e., for example, the position of the center and the orientation of the workpiece axes) of the workpiece in the working space must then be brought into an initial coincidence with the position of the virtual workpiece in the virtual working space to an extent that allows appropriate probing to be performed subsequently in the method. To this end, the operator may, on the one hand, attempt to clamp the workpiece in the working space as specified in the virtual working space displayed on the display screen of the numerical control system. On the other hand, it is also possible to insert the workpiece into the working space and then bring the virtual workpiece into line with the real setup. Using direction keys or other input devices, the virtual workpiece can be moved and rotated on the display screen in such a way that it coincides to the extent possible with reality. A two- or multi-stage process including both methods may also achieve the goal. For spatial orientation, T-slots in the table of the machine tool are used, for example, which allow the workpiece to be roughly positioned, in reality or virtually. In tests, it has proven to be a good orientation aid to position the probe in the working space opposite a distinctive point of the workpiece and then align the virtual workpiece relative to the virtual probe using the direction keys of the control system.

An initial coincidence or accuracy should be achieved, which may, for example, be defined such that no point of the workpiece is more than a few centimeters away from its virtual counterpart. A rule of thumb may be that half the extent of the smallest workpiece element to be measured should be aimed at as an initial coincidence; i.e., for example, half the diameter of a hole that is to be probed for purposes of aligning the workpiece.

If the workpiece is probed in the further course of the method, this results in a certain tolerance range or expected range within which a contact probing event should be registered. If, in the further course of the method, a contact probing event is detected too early or not within the tolerance range, then this is an indication of an excessive deviation between the real setup and the virtual image thereof. It is then possible to respond with a corresponding error message and to first further improve the initial coincidence, in the sense of branching back to step 2.

In step 3, the operator positions the probe in the working space. For this purpose, the probe can be moved in the working space using direction keys, a handwheel, or other input devices, this movement also being reproduced in the virtual working space and displayed on the display screen of the control system. In order to reach areas of the workpiece that are not directly accessible, it is also possible, for example, to move angled axes of the machine so as to tilt the workpiece or the probe. Functions that keep the distance between the tool (in this case the probe) and the workpiece constant are very useful in this context. Collision monitoring can also assist with this, even if the position of the workpiece is not yet known with optimum accuracy. It is nevertheless possible to reliably detect collisions of the probe with other machine elements since their positions are known at all times.

Ultimately, the operator moves the probe close to areas of the workpiece that appear to be appropriate for probing. In the process, the control system continuously calculates a probing vector from the probe ball to the workpiece. This specifies a probing direction and a (planned) probing point on the workpiece. This calculation is done by determining in each case the shortest distance between the mesh of the probe ball and the mesh of the workpiece (i.e., between the virtual images of the probe ball and the workpiece). For this calculation, there are very fast numerical methods (e.g., bounding volume hierarchy), so that the probing vector can be calculated and displayed at short intervals of, for example, 20 milliseconds. This allows the operator to see on the display screen at any time which probing point is being targeted and to adjust the position of the probe.

In step 4, the quality of the probing point is continuously calculated, and probing is enabled only on condition that this quality is sufficient. The quality takes into account, for example, the measurement accuracy, incorrect probing directions, as well as the chord error in the modeling process. For the probing point, there are known the enclosing surface, its neighboring surfaces, and the vertex and surface normals thereof.

In order to achieve high measurement accuracy, probing must be as performed as perpendicular as possible to the workpiece. Edges and excessively curved surfaces must be avoided. This can be done by considering the angles between the surface normals near the probing point and the probing vector. These should in any case be less than 30 degrees, preferably less than 20 degrees, or, even better, less than 10 degrees. In this context, the term "near" should be understood, for example, as follows: considered are all surface elements that lie in a region around the probing point, whose diameter is equal to that of the probe body plus the still present uncertainty in the orientation of the workpiece. Alternatively, it is possible to simply consider the surface elements immediately adjacent to the surface element being probed. Large deviations between the surface normals and the probing vector are an indication of a highly curved surface or even an edge in the workpiece. The local radius of curvature can be approximated by the surfaces enclosing the probing point and their vertex normals. This local radius of curvature should be significantly larger than the radius of the probe ball. In areas of large curvatures (and thus small curvature radii) or even edges, no probing is possible.

Even small discrepancies between reality and model can lead to great uncertainties in the calculated coordinates. Therefore, the probing points should be located in regions of the workpiece which are modeled with maximum possible accuracy. Since a mesh linearizes free-form surfaces, large curvatures are associated with a modeling error (chord error), and preference should be given to planar surfaces. Therefore, probing points in such areas should not be enabled.

Another criterion for the quality of a probing point is that the virtual probe ball must be located outside the virtual workpiece. If the virtual probe ball intersects the virtual workpiece, or if it is even located completely within the virtual workpiece, then the probing direction cannot be determined, and there is no suitable probing point at all.

If a probing vector having a probing point and a probing direction is determined with sufficient quality for the current position of the probe, then this is signaled to the operator. A good way to do this is to display the probing vector in red color if the quality is insufficient, and in green color if the quality is sufficient and probing is thus enabled. Another way may be to not display a probing vector until the quality is sufficient, or to cross out the probing vector or display an alert next to the probing vector if the quality is insufficient. A check mark next to the probing vector can also be intuitively understood by the operator as a sign of sufficient quality and enablement of the probing process.

Steps 3 and 4 are performed in a kind of loop continuously one after the other or simultaneously or in parallel. While the probe is moved in step 3, the displayed probing vector may very well change several times between sufficient quality and insufficient quality, depending on the result in step 4. While this occurs, probing does not yet take place.

This process ends when the operator triggers a probing operation in step 5. The prerequisite for this is that probing is enabled at this moment. The operator can then trigger the probing operation along the current probing vector by pressing a button or using other input devices. A button with a start functionality is found on any numerical control system of a machine tool to start certain operations depending on the context. This start button lends itself in this context as well.

The probing allows the control system to determine the coordinates of the probing point in a conventional way and make them available for further processing. If the probing point is not within the expected area, or if no probing point is registered after a certain distance, the method is aborted with an error message. The coincidence of the real setup with the virtual setup is then not accurate enough, and thus the calculation of the quality of a (planned) probing point is no longer reliable. The method should then be restarted from the beginning or from step 2.

If in step 5, a probing process was triggered and coordinates of the probing point were successfully determined, the additional information obtained is processed in step 6. For this purpose, the position of the virtual workpiece is recalculated to take into account the additional position information obtained from the acquired coordinates of the probing point. A simple example would be a probing point on a surface of the workpiece which is defined by the Y and Z directions and probed in the X direction: with the X coordinate of the probing point, the position of the virtual workpiece can now be determined much more accurately than by the "by eye" positioning of the workpiece initially performed in step 2. Even with this one probing point, the coincidence between the virtual setup and the real setup is better than the initial coincidence. If another point on this surface that is offset from the first probing point in the Y direction is probed, the rotation of the workpiece about the Z axis can also be determined. Additional probing points thus increase the coincidence further and further. In general, it is advisable to distribute the probing points, to the extent possible, over the entire workpiece in order to achieve the best possible leverage on rotations.

Furthermore, in step 6, the operator may be provided with additional supporting information that graphically illustrates the progress and quality of the overall process.

Each probing point is permanently displayed in the virtual working space. The workpiece should then conform to all the probing points visualized in this way. This allows the operator, for example, to detect deviations between the model and reality. The distances of all probing points from the model may be statistically analyzed. In this context, the mean square deviation provides information on quality. Here, a deviation of about 0.5 millimeters is a reference point because with this uncertainty, it is possible, for example, to very effectively perform collision monitoring.

Moreover, it is also possible to display by color in a traffic light style whether enough information is available to determine the respective axis directions. If an object is probed, for example, only in the X direction, then nothing can be said about the Z component. This can be visualized, for example, by axis designations highlighted in color, with a green X and a red Z. It is then very easy to identify which probing directions may still lead to an improvement in the alignment process.

Directions already defined by the setup situation should be blocked in an automated manner or by the operator and displayed in the progress indicator in green color or be grayed out, the latter being an indication that this axis direction is not involved in the alignment process.

In addition, the progression of the corrections of the determined workpiece position can be displayed in a diagram as a whole or per coordinate. If the change in position just obtained by the last probing point is plotted here, it is possible to intuitively determine whether the alignment process converges. While the first probing points still cause relatively large changes or corrections, later probing points should only cause small changes.

These indicators (conforming virtual probing points, spatial directions marked in color, the progression of the corrections obtained per probing point) indicate to the operator, individually or in combination, whether the probing operation is complete or whether further probing needs to be performed at other positions. Automated assessment of these criteria is also possible, so that the attainment of the final coincidence can be detected without involvement of the operator, and the method can be terminated.

Thus, in last step 7, a decision is made as to whether the achieved coincidence of the virtual position of the workpiece with the actual position is accurate enough; i.e., whether the final coincidence has been attained. If this is the case, the method for aligning a workpiece ends, but if this is not the case, the method branches to step 3 and searches for another probing point.

At this point, it should once again be noted that the term "workpiece" refers to the actual workpiece to be machined and/or to a clamping means for it. Aligning a clamping means without a workpiece to be machined is also expressly encompassed by embodiments of the present invention.

It has been found that the method described herein assists an operator in a very intuitive way in aligning a setup situation in a machine tool using a probe. In contrast to known methods, no effort is required for programming fixed probing cycles. Anomalies in the workpiece, such as damage or labels, can be easily omitted during probing. Workpieces of any shape can be easily aligned provided a model of the workpiece is available. Through iterative feedback via the information obtained with each probing point, the operator gets good clues about further probing points and thus gains experience very quickly.

In a very simplified but apt summary, the steps that are executed in an automated manner in the background of the method enable an operator of a machine tool to carry out the actually complex process of aligning a workpiece by moving a probe around the workpiece, and to then perform the probing operation by means of the start button when probing is enabled. Feedback via the information so obtained occurs immediately.

The method makes it possible to easily align even unusually shaped workpieces with free-form surfaces or even inclined surfaces (e.g., pyramids). By using the rotary axes of the machine, even difficult-to-access measurement points can be included without additional computational effort for the operator.

Further advantages and features of the present invention will be apparent from the following description of various embodiments, taken in conjunction with the figures.

Figure 1:
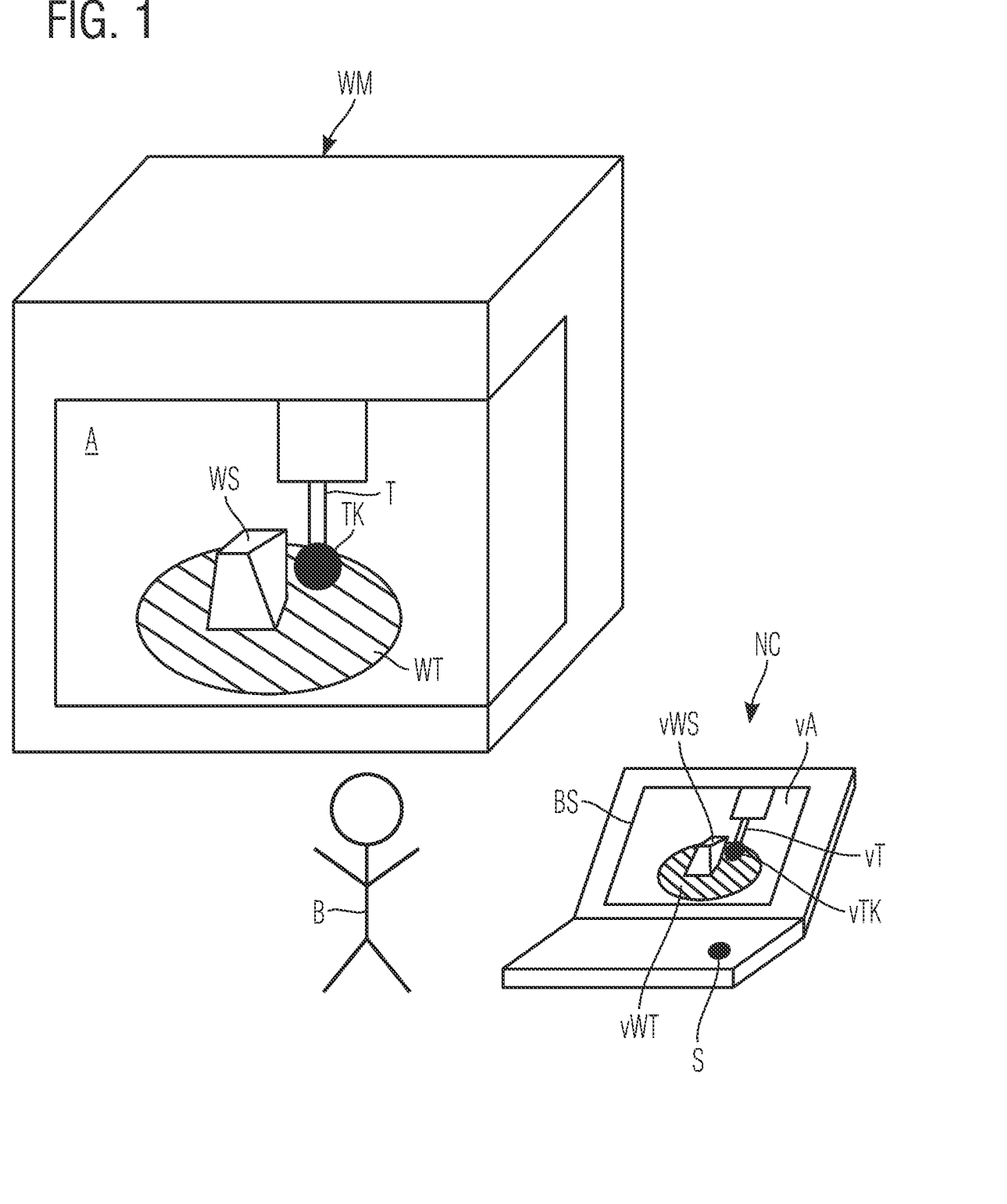
FIG. 1 shows a machine tool having a numerical control system.

FIG. 1 shows a view into the working space A of a machine tool WM. There, a workpiece WS is disposed on a work table WT. The position of this workpiece WS is to be determined by a probe T probing the workpiece WS with the probe ball TK. A numerical control system NC is provided for this purpose, which allows a view into a virtual working space vA on a display screen BS.

The elements of working space A that are important to an operator B are also displayed in virtual working space vA: virtual work table vWT with virtual workpiece vWS, as well as virtual probe vT with virtual probe ball vTK. For this purpose, the required 3D models are provided in the NC control system in accordance with step 1 described hereinabove. Also shown is a start button S as a central control element for aligning workpiece WS. Start button S is used in step 5 to trigger a probing operation.

Figure 2:
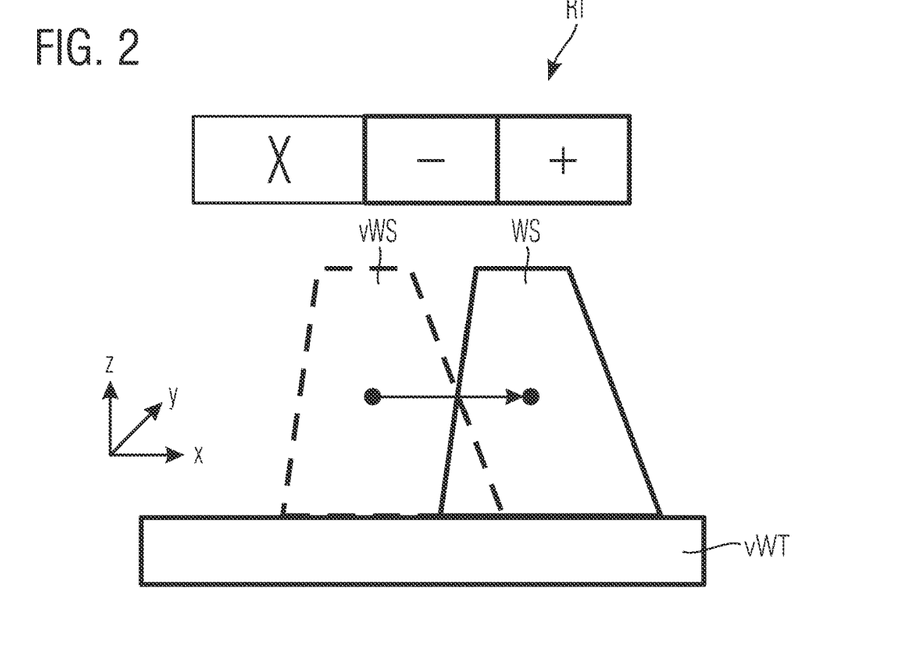
FIGS. 2 and 3 show the orientation of a virtual workpiece in two directions.
Figure 3:
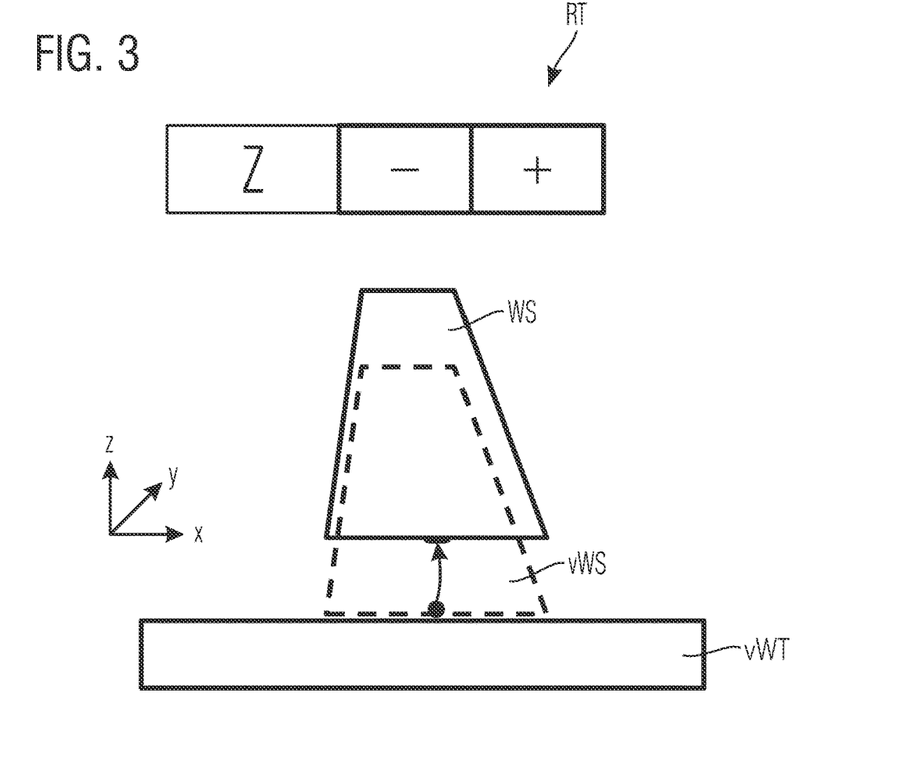

FIGS. 2 and 3 show direction keys RT of numerical control system NC, which allow virtual workpiece vWS to be positioned as required in step 2. By pressing the direction keys of the respective desired axis directions X, Y, Z, virtual workpiece vWS can be moved on virtual work table vWT in such a way that its position coincides with the real workpiece WS. In FIG. 2, virtual workpiece vWS is moved in the positive X direction, in FIG. 3 in the positive Z direction, in order to bring virtual workpiece vWS into an initial coincidence with real workpiece WS.

Figure 4:
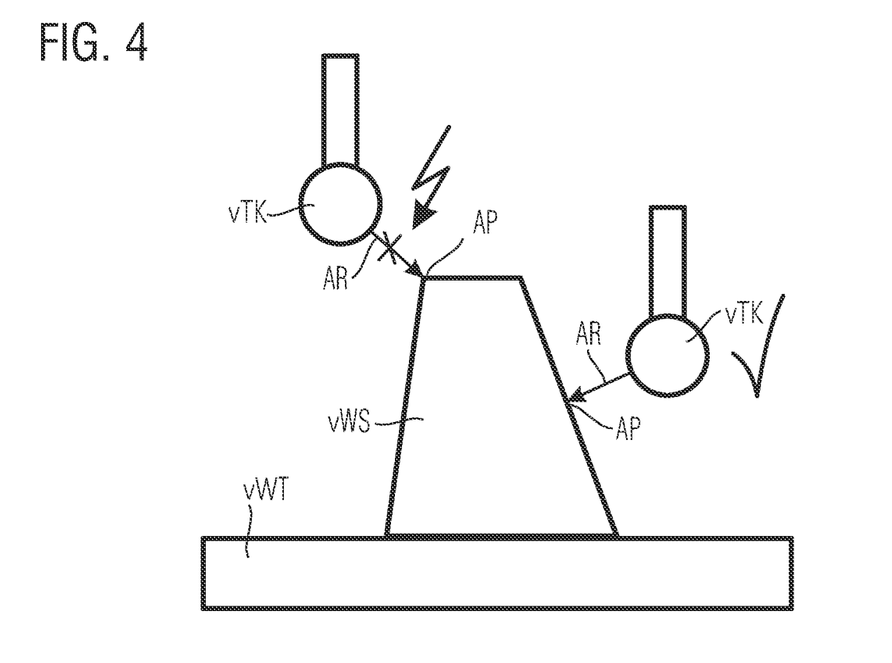
FIGS. 4 and 5 show various permissible and impermissible probing points.
Figure 5:
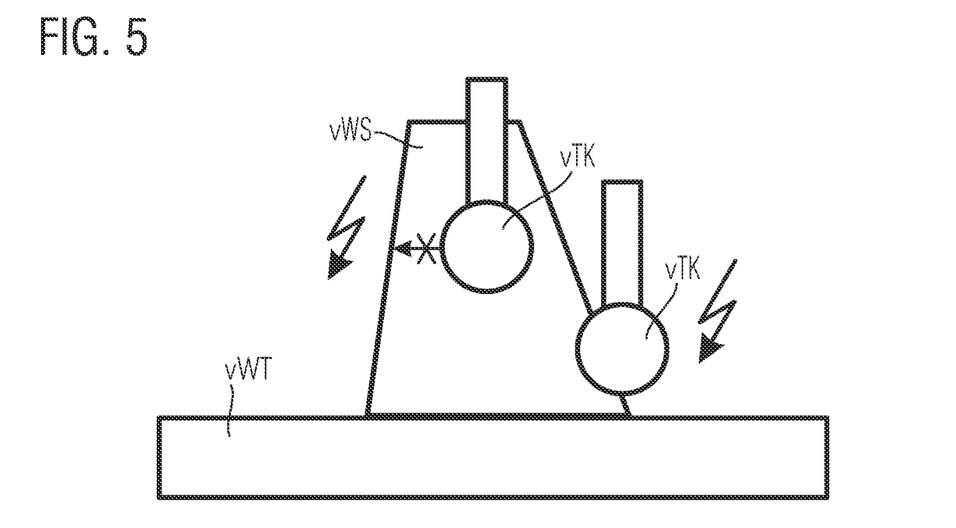

FIGS. 4 and 5 show the representations on the display screen BS during steps 3 and 4. In a representation of virtual probe vT and virtual workpiece vWS, the (planned) probing point AP determined in step 3 and the probing direction AR, as well as an indication of the quality of the probing point or of the enablement of the probing process are displayed, for example, by means of check marks and flash symbols, crossed-out or non-cross-out arrows, arrows in red or green color, or in any other way. FIG. 4 shows a permissible probing point AP on a surface of virtual workpiece vWS, as well as an impermissible probing point AP with respect to an edge of virtual workpiece vWS. The probe positions shown in FIG. 5 are both impermissible because virtual probe ball vTK is located within virtual workpiece vWS or intersects it.

Figure 6:
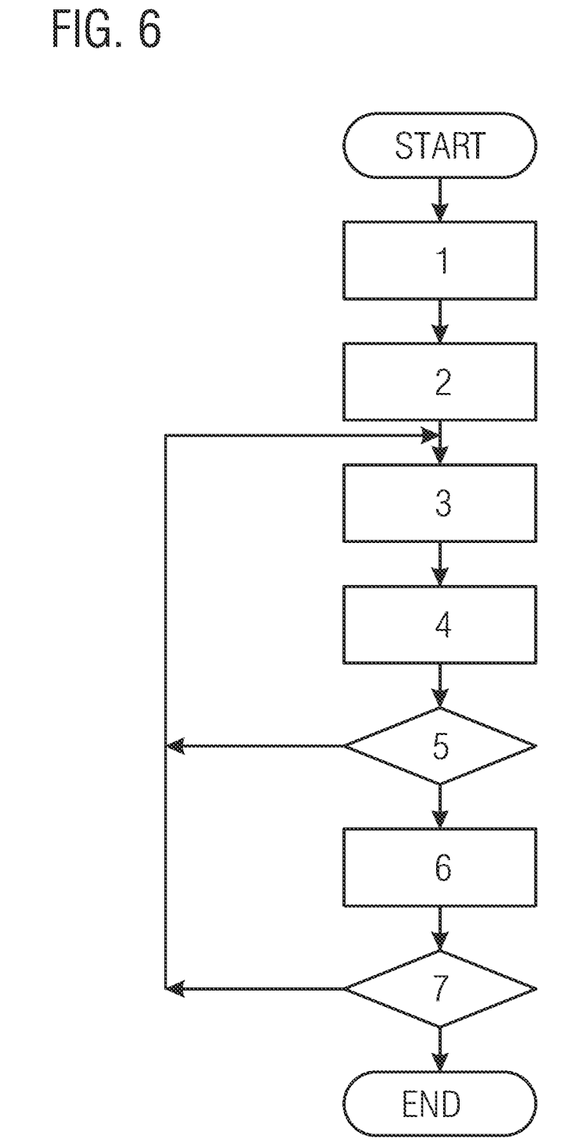
FIG. 6 shows a flow diagram of the method for aligning a workpiece according to an embodiment of the present invention.

FIG. 6 illustrates the sequence of the method described in the general section above, including its essential steps 1 through 7:
1: providing 3D models of working space A, probe T, and of workpiece WS and displaying these models as a virtual workpiece vWS and a virtual probe vT in a virtual working space vA on a display screen BS of numerical control system NC;
2: positioning workpiece WS in working space A of machine tool WM and virtual workpiece vWS in virtual working space vA so that there is an initial coincidence between a position of workpiece WS in working space A and the position of virtual workpiece vWS in virtual working space vA;
3: manually positioning probe T relative to workpiece WS and, in the process, selecting a planned probing point AP and a probing direction AR in an automated manner based on a minimum distance of virtual probe vT from virtual workpiece vWS, and displaying the planned probing point AP and probing direction AR in virtual working space vA;
4: determining the quality of the planned probing point AP and enabling the probing process if the quality is sufficient, the quality being determined, for example, based on the local curvature of workpiece WS at probing point AP;
5: (operator B) triggering the probing operation when probing is enabled, and determining coordinates of probing point AP, and if triggering has not yet occurred and probe T is instead moved further, the method branching from there back to step 3;
6: recalculating the position of workpiece WS using the coordinates of probing point AP, and updating the position of virtual workpiece vWS in virtual working space vA;
7: repeating the steps 3 through 6 until a final coincidence is reached between the position of virtual workpiece vWS in virtual working space vA and the position of workpiece WS in working space A.

Numerical control system NC is configured to carry out this method including the steps 1 through 7, whereby operator B is assisted in the best possible way in the task of aligning workpiece WS. During the actual alignment of the workpiece, very simple and intuitive interactions are required of the operator only in steps 3 and 5 in order to achieve the desired goal.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for aligning a workpiece in a working space of a machine tool having a numerical control system using a probe, the method comprising:
   (1) providing three-dimensional (3D) models of the working space, the probe, and the workpiece and displaying the 3D models as a virtual workpiece and a virtual probe in a virtual working space on a display screen of the numerical control system;
   (2) positioning the workpiece in the working space of the machine tool and the virtual workpiece in the virtual working space so that there is an initial coincidence between a position of the workpiece in the working space and a position of the virtual workpiece in the virtual working space;
   (3) manually positioning the probe relative to the workpiece, wherein a planned probing point and a probing direction are selected in an automated manner based on a minimum distance of the virtual probe from the virtual workpiece, and the planned probing point and the probing direction are displayed in the virtual working space;
   (4) determining a quality of the planned probing point and enabling a probing process based on the quality;
   (5) triggering a probing operation based on the probing process being enabled, and determining coordinates of a probing point,
   (6) recalculating the position of the workpiece using the coordinates of the probing point, and updating the position of the virtual workpiece in the virtual working space;
   (7) repeating the steps (3) through (6) until a final coincidence is reached between the position of the virtual workpiece in the virtual working space and the position of the workpiece in the working space.

2. The method as recited in claim 1, wherein the quality is determined in step (4) at least based on a local curvature of the virtual workpiece at the planned probing point.

3. The method as recited in claim 1, wherein, in step (4), a deviation of the probing direction from a surface normal of the workpiece in a region of the planned probing point is used for determining the quality, and wherein the probing process is enabled in a case that the deviation is not greater than 30°.

4. The method as recited in claim 1, wherein, in step (4), it is determined that the quality is insufficient for probing points on edges of the workpiece such that the probing points on the edges of the workpiece are excluded from probing.

5. The method as recited in claim 1, wherein, in step (4), an indication of the enablement or non-enablement of the probing process is graphically displayed on the display screen.

6. The method as recited in claim 1, wherein, in step (6), information on an already achieved coincidence between the positions of the virtual workpiece and the workpiece is additionally displayed on the display screen.

7. The method as recited in claim 6, wherein a progression of correction of the position of the virtual workpiece achieved by a respective probing point is displayed for a plurality of already processed probing points.

8. The method as recited in claim 6, wherein each of the probing points is permanently displayed in the virtual working space.

9. A numerical control system for a machine tool, configured to carry out the method according to claim 1.

* * * * *